United States Patent
Chen

(10) Patent No.: US 10,687,191 B1
(45) Date of Patent: Jun. 16, 2020

(54) BLUETOOTH GATEWAY

(71) Applicant: Ming-Tsung Chen, Taipei (TW)

(72) Inventor: Ming-Tsung Chen, Taipei (TW)

( * ) Notice: Subject to any disclaimer, the term of this patent is extended or adjusted under 35 U.S.C. 154(b) by 0 days.

(21) Appl. No.: 16/238,611

(22) Filed: Jan. 3, 2019

(51) Int. Cl.
*H04W 4/80* (2018.01)
*H04W 88/16* (2009.01)

(52) U.S. Cl.
CPC ............. *H04W 4/80* (2018.02); *H04W 88/16* (2013.01)

(58) Field of Classification Search
CPC .................................................... H04W 4/80
See application file for complete search history.

(56) References Cited

U.S. PATENT DOCUMENTS

| | | | |
|---|---|---|---|
| 7,839,859 B2 | 11/2010 | Kim et al. | |
| 2003/0016651 A1* | 1/2003 | Kwok | H04J 13/00 370/349 |
| 2005/0186907 A1* | 8/2005 | Tailor | H04W 88/04 455/41.2 |
| 2006/0034231 A1* | 2/2006 | Tailor | H04W 88/02 370/338 |
| 2011/0028093 A1* | 2/2011 | Patel | H04B 17/27 455/41.2 |
| 2012/0020215 A1* | 1/2012 | Lai | H04L 43/0817 370/235 |
| 2012/0020339 A1* | 1/2012 | Lai | H04W 48/20 370/338 |
| 2017/0272270 A1* | 9/2017 | Gu | H04B 7/15507 |

FOREIGN PATENT DOCUMENTS

| | | |
|---|---|---|
| CN | 101626560 A | 1/2010 |
| TW | I445370 B | 7/2014 |

* cited by examiner

*Primary Examiner* — Wen W Huang
(74) *Attorney, Agent, or Firm* — Li & Cai Intellectual Property (USA) Office

(57) ABSTRACT

A Bluetooth gateway communicating with a plurality of electronic devices includes a first Bluetooth module including a first communication sequence, and a second Bluetooth module being electrically connected to the first Bluetooth module and including a second communication sequence. The first Bluetooth module and the second Bluetooth module determine whether to communicate with one of the electronic devices based on the first communication sequence and the second communication sequence, and current connection states of the first Bluetooth module and the second Bluetooth module.

8 Claims, 5 Drawing Sheets

BLUETOOTH GATEWAY

FIELD OF THE DISCLOSURE

The present disclosure relates to a Bluetooth gateway, and more particularly to a Bluetooth gateway simultaneously processing multiple Bluetooth connections.

BACKGROUND OF THE DISCLOSURE

Nowadays, Bluetooth communication is used extensively in electronic products. However, due to the sheer amount of Bluetooth signals, the gateway device may miss some of the signals or cannot process the signals immediately.

Therefore, it is an important issue in the industry to provide a Bluetooth gateway device that can effectively improve the processing efficiency thereof.

SUMMARY OF THE DISCLOSURE

In response to the above-referenced technical inadequacies, the present disclosure provides a Bluetooth gateway communicating with a plurality of electronic devices. The Bluetooth gateway includes a first Bluetooth module including a first communication sequence, and a second Bluetooth module being electrically connected to the first Bluetooth module and including a second communication sequence. The first Bluetooth module and the second Bluetooth module determine whether to communicate with one of the electronic devices based on the first communication sequence and the second communication sequence, and current connection states of the first Bluetooth module and the second Bluetooth module.

Therefore, the Bluetooth gateway of the present disclosure uses a plurality of Bluetooth modules and a preset communication sequence, so that the Bluetooth signals of the devices of the plurality of electronic devices can be processed immediately, thereby significantly improving the user experience. The Bluetooth gateway of the present disclosure can transmit a transmission period adjusting request signal to each electronic device to adjust the transmission period for improving the processing efficiency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
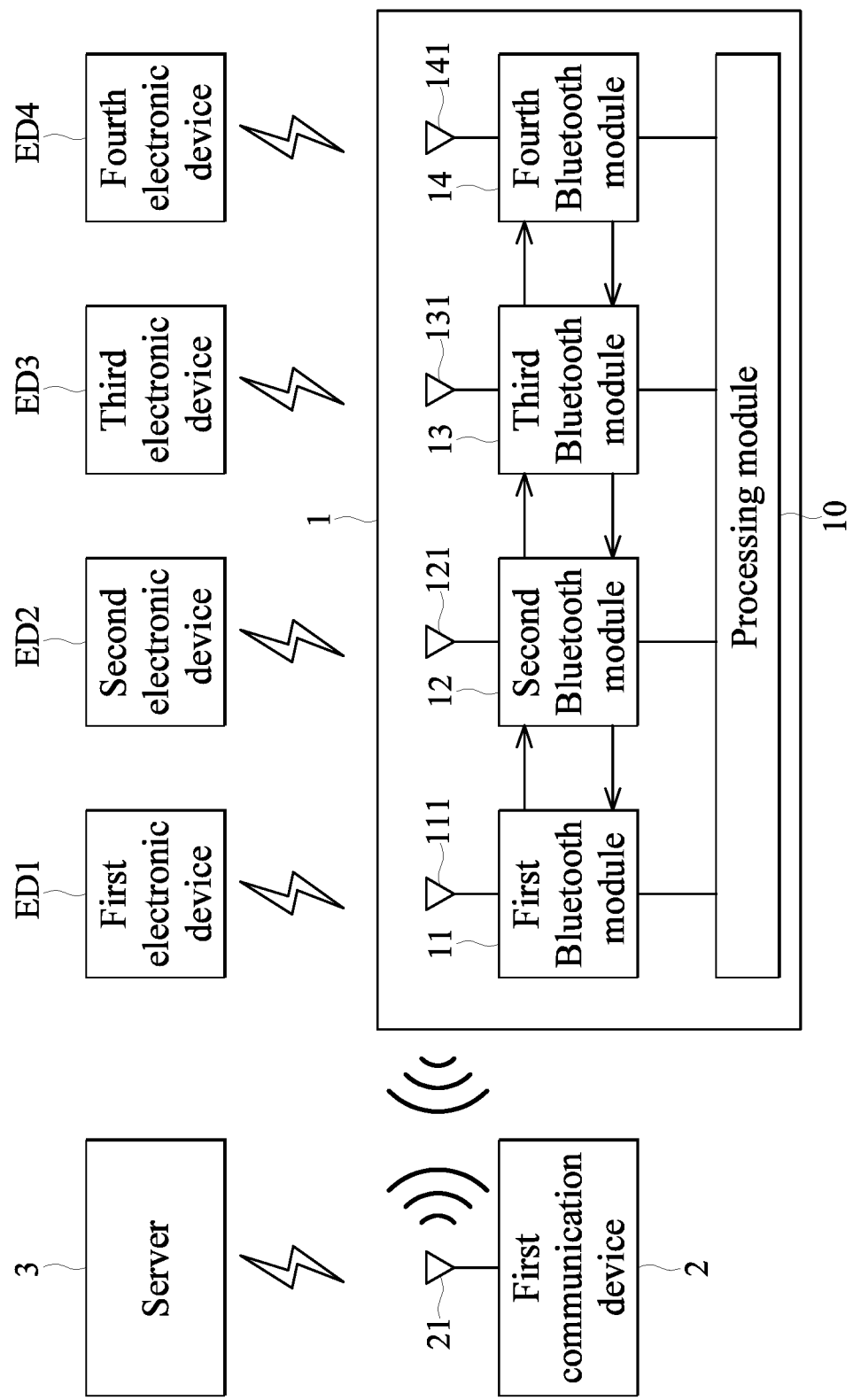
FIG. 1 is a schematic diagram of a Bluetooth gateway communicating with a first communication device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, FIG. 1 is a schematic diagram of a Bluetooth gateway communicating with a first communication device according to an embodiment of the present disclosure.

In the embodiment, the Bluetooth gateway 1 includes a processing module 10, a first Bluetooth module 11, a second Bluetooth module 12, a third Bluetooth module 13, and a fourth Bluetooth module 14.

The processing module 10 is electrically connected to the first Bluetooth module 11, the second Bluetooth module 12, the third Bluetooth module 13, and the fourth Bluetooth module 14.

The first Bluetooth module 11, the second Bluetooth module 12, the third Bluetooth module 13, and the fourth Bluetooth module 14 respectively receive device Bluetooth signals of a first electronic device ED1, a second electronic device ED2, the third electronic device ED3, and the fourth electronic device ED4 through a first Bluetooth antenna 111, a second Bluetooth antenna 121, a third Bluetooth antenna 131, and a fourth Bluetooth antenna 141.

In the embodiment, the first Bluetooth module 11, the second Bluetooth module 12, the third Bluetooth module 13, and the fourth Bluetooth module 14 are respectively first in communication sequence, second in communication sequence, third in communication sequence, and fourth in communication sequence.

That is, when the current connection state of the first Bluetooth module 11 is an unconnected state, the second Bluetooth module 12, the third Bluetooth module 13, and the fourth Bluetooth module 14 cannot communicate with the electronic devices.

The second Bluetooth module 12 can communicate with each electronic device only when the current connection state of the first Bluetooth module 11 is already in a connected state with one of the electronic devices. However, the third Bluetooth module 13 and the fourth Bluetooth module 14 still cannot communicate with the electronic devices.

That is, the third Bluetooth module 13 can communicate with other electronic devices only after the first Bluetooth module 11 and the second Bluetooth module 12 have communicated with the electronic devices.

That is, the first Bluetooth module 11, the second Bluetooth module 12, the third Bluetooth module 13, and the fourth Bluetooth module 14 determine whether to communicate with one of the electronic devices based on the communication sequences and the current connection states of the first Bluetooth module 11, the second Bluetooth module 12, the third Bluetooth module 13, and the fourth Bluetooth module.

In other words, when the current connection state of the first Bluetooth module 11 is an unconnected state, only the first Bluetooth module 11 can communicate with one of the plurality of electronic devices ED1-ED4.

Figure 4A:
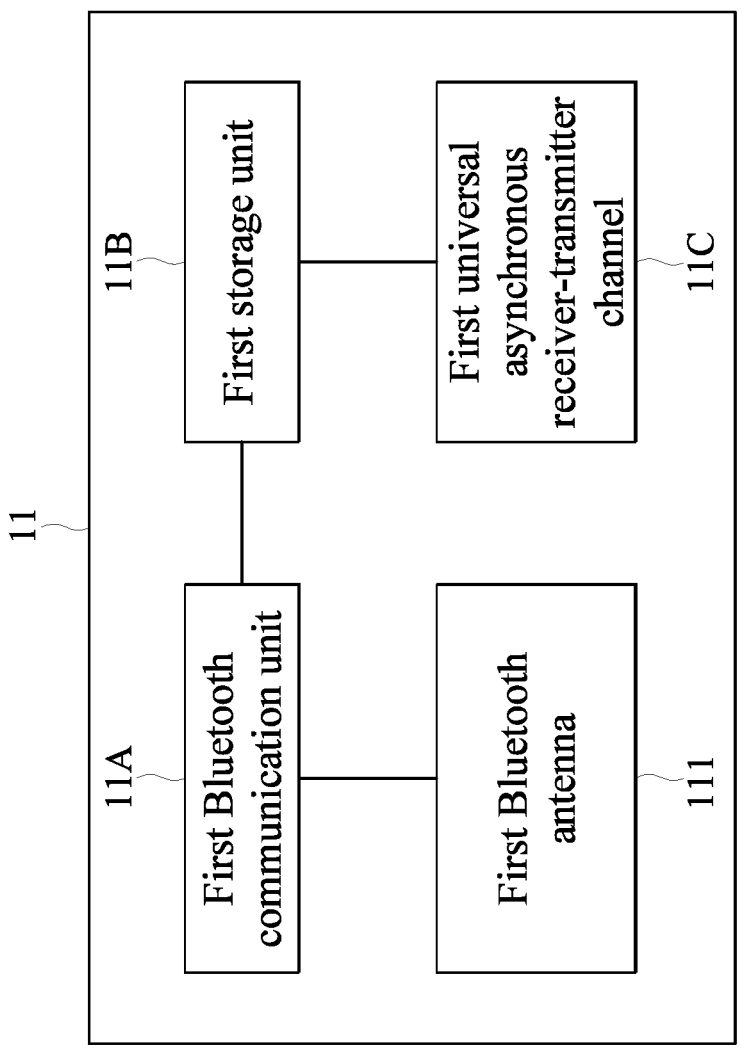
FIG. 4A and FIG. 4B are schematic diagrams respectively showing a first Bluetooth module and a second Bluetooth module according to an embodiment of the present disclosure.
Figure 4B:
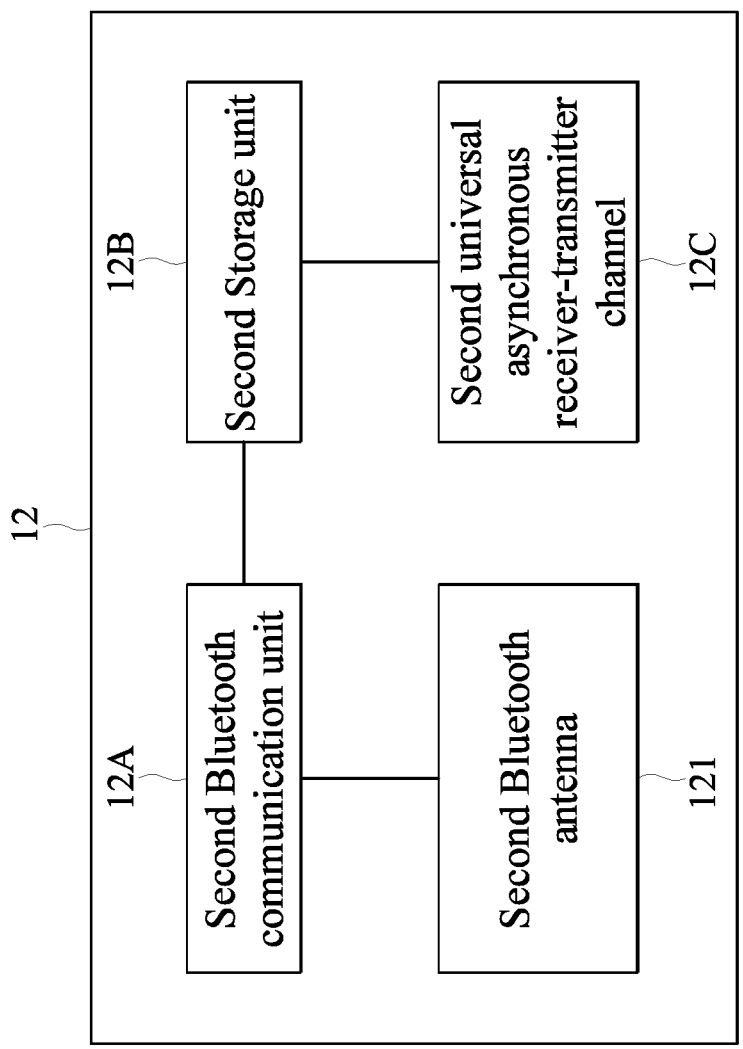

Referring to FIG. 4A and FIG. 4B, FIG. 4A and FIG. 4B are schematic diagrams respectively showing the first Bluetooth module and the second Bluetooth module according to an embodiment of the present disclosure.

In the embodiment, the structure and function of the first Bluetooth module 11 and the second Bluetooth module 12 are described below. The structure and function of the other Bluetooth modules are similar to the first Bluetooth module 11 and the second Bluetooth module. 12, and are not described herein. In the embodiment, the first Bluetooth module 11 includes a first Bluetooth antenna 111, a first Bluetooth communication unit 11A, a first storage unit 11B, and a first universal asynchronous receiver-transmitter channel (UART channel) 11C.

The first Bluetooth communication unit 11A is electrically connected to the first Bluetooth antenna 111 and the first storage unit 11B. The first Bluetooth communication unit 11A receives a plurality of communication signals through the first Bluetooth antenna 111. The first storage unit 11B is electrically connected to the first Bluetooth communication unit 11A. The first UART channel 11C is electrically connected to the storage unit 11B. In the embodiment, the plurality of communication signals received by the first Bluetooth communication unit 11A are transmitted through the first UART channel 11C. That is, the plurality of communication signals received by the first Bluetooth communication unit 11A are not processed by the processing module 10, but are directly transmitted through the first UART channel 11C. Therefore, the computing resource of the processing module 10 can be reduced.

Similarly, the second Bluetooth module 12 includes a second Bluetooth antenna 121, a second Bluetooth communication unit 12A, a second storage unit 12B, and a second UART channel 12C.

The second Bluetooth communication unit 12A is electrically connected to the second Bluetooth antenna 121 and the second storage unit 12B. The second Bluetooth communication unit 12A receives a plurality of communication signals through the second Bluetooth antenna 121. The second storage unit 12B is electrically connected to the second Bluetooth communication unit 11A. The second UART channel 12C is electrically connected to the second storage unit 12B. In the embodiment, the plurality of communication signals received by the second Bluetooth communication unit 12A are transmitted through the second UART channel 12C. That is, the plurality of communication signals received by the second Bluetooth communication unit 12A are not processed by the processing module 10, but are directly transmitted through the second UART channel 12C. Therefore, the computing resource of the processing module 10 can be saved.

Referring to FIG. 1, in the embodiment, the signals transmitted by the first UART channel 11C and the second UART channel 12C are connected to the first communication device 2 by a first wireless communication protocol. The received device Bluetooth signals are transmitted to the server 3.

In the embodiment, the first UART channel 11C and the second UART channel 12C, the third UART channel (not shown), and the fourth UART channel (not shown) of the first Bluetooth module 11, the second Bluetooth module 12, the third Bluetooth module 13, and the fourth Bluetooth module 14 communicate with the communication device 2 through the first communication antenna 21 by the first wireless communication protocol.

In the embodiment, the first UART channel 11C, the second UART channel 12C, the third UART channel (not shown), the fourth UART channel (not shown) are used by direct memory access (DMA). In other embodiments, other techniques may be used, and are not limited in the present disclosure.

In the embodiment, the first wireless communication protocol includes a WiFi communication protocol, a Sigfox communication protocol, a LoRa communication protocol, a fourth generation mobile communication technology communication protocol (4G), or a fifth generation mobile communication technology communication protocol (5G).

In the embodiment, when the first electronic device ED1, the second electronic device ED2, the third electronic device ED3, and the fourth electronic device ED4 simultaneously transmit the device Bluetooth signals, and the first Bluetooth module 11, the second Bluetooth module 12, the third Bluetooth module 13, and the fourth Bluetooth module 14 simultaneously and respectively receive the device Bluetooth signals, the Bluetooth gateway 1 transmits a transmission period adjusting request signal to the first Bluetooth module 11, the second Bluetooth module 12, the third Bluetooth module 13, and the fourth Bluetooth module 14, such that the first Bluetooth module 11, the second Bluetooth module 12, the third Bluetooth module 13, and the fourth Bluetooth module 14 respectively modulate the transmission period of the transmitting signals.

In the embodiment, the first electronic device ED1, the second electronic device ED2, the third electronic device ED3, and the fourth electronic device ED4 may adjust the transmitting period by multiplying by a random number, such that the device Bluetooth signals of the first electronic device ED1, the second electronic device ED2, the third electronic device ED3, and the fourth electronic device ED4 are sequentially received and processed at different time points.

Second Embodiment

Figure 2:
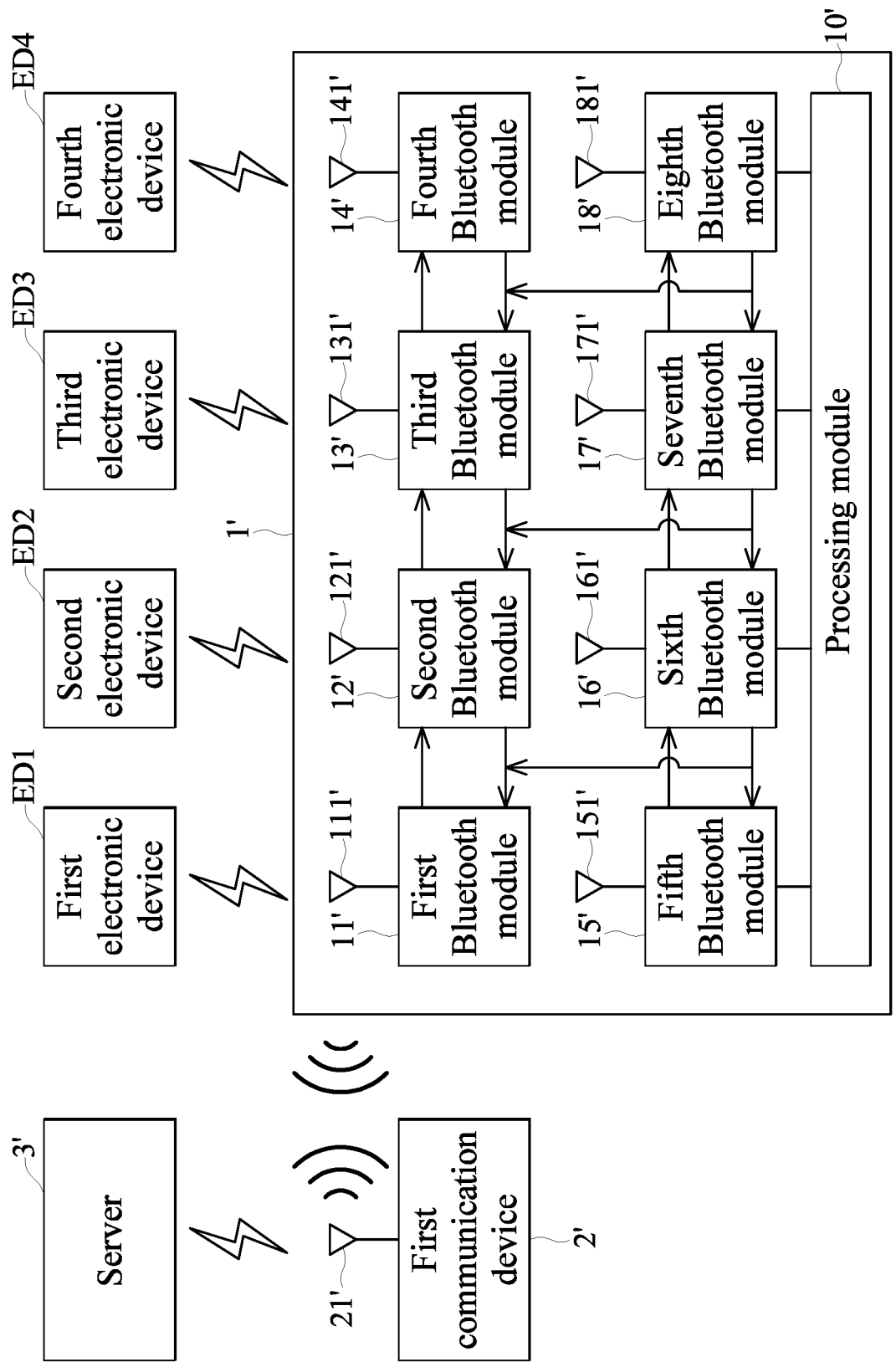
FIG. 2 is another schematic diagram of a Bluetooth gateway communicating with a first communication device according to an embodiment of the present disclosure.

Referring to FIG. 2, FIG. 2 is another schematic diagram of a Bluetooth gateway communicating with a first communication device according to an embodiment of the present disclosure.

In the embodiment, the Bluetooth gateway 1' includes a processing module 10', a first Bluetooth module 11', a second Bluetooth module 12', a third Bluetooth module 13', a fourth Bluetooth module 14', a fifth Bluetooth module 15, a sixth Bluetooth module 16', a seventh Bluetooth module 17', and an eighth Bluetooth module 18'.

The processing module 10' is electrically connected to the first Bluetooth module 11', the second Bluetooth module 12', the third Bluetooth module 13', the fourth Bluetooth module 14', the fifth Bluetooth module 15, and the sixth Bluetooth module 16', the seventh Bluetooth module 17', and the eighth Bluetooth module 18'.

The first Bluetooth module 11', the second Bluetooth module 12', the third Bluetooth module 13', the fourth Bluetooth module 14', the fifth Bluetooth module 15, the sixth Bluetooth module 16', the seventh Bluetooth The module 17' and the eighth Bluetooth module 18' respectively receive the device Bluetooth signals of the first electronic device ED1, the second electronic device ED2, the third electronic device ED3, or the fourth electronic device ED4 through a first Bluetooth antenna 111', a second Bluetooth antenna 121', a third Bluetooth antenna 131', a fourth Bluetooth antenna 141' and a fifth Bluetooth antenna 151', a sixth Bluetooth antenna 161', a seventh Bluetooth antenna 171', and an eighth Bluetooth antenna 181'.

In this embodiment, the first Bluetooth module 11' to the eighth Bluetooth module 18' are respectively first in communication sequence, second in communication sequence, third in communication sequence, fourth in communication sequence, fifth in communication sequence, sixth in communication sequence, seventh in communication sequence, and eighth in communication sequence.

That is, in the embodiment, when the current connection state of the first Bluetooth module 11 is the unconnected state, the other Bluetooth modules 12'~18' cannot communicate with each of the electronic devices.

In other embodiments, as shown in FIG. 2, the first Bluetooth module 11' to the eighth Bluetooth module 18' are arranged in matrix. The Bluetooth modules can communicate with the electronic devices based on the sequence in different rows. That is, the first Bluetooth module 11' and the fifth Bluetooth module 15' can respectively communicate with electronic devices at the same time, and do not need to wait until after the second Bluetooth module 12', the third Bluetooth module 13', and the fourth Bluetooth module 14' have communicated with the electronic devices. In other words, the communication sequence of the fifth Bluetooth module 15' is first in priority of the Bluetooth modules of the second column.

In other embodiments, the communication sequence can be adjusted based on the actual requirements, and are not limited in the present disclosure.

In the embodiment, the first UART channel (not shown), the second UART channel (not shown), the third UART channel (not shown), the fourth UART channel (not shown), the fifth UART channel (not shown), the sixth UART channel (not shown), the seventh UART channel (not shown), and the eighth UART channel (not shown) of the first Bluetooth module 11', the second Bluetooth module 12', the third Bluetooth module 13', the fourth Bluetooth module 14', the fifth Bluetooth module 15, the sixth Bluetooth module 16', the seventh Bluetooth module 17', and the eighth Bluetooth module 18' communicate with the first communication device 2' by the first wireless communication protocol.

Third Embodiment

Figure 3:
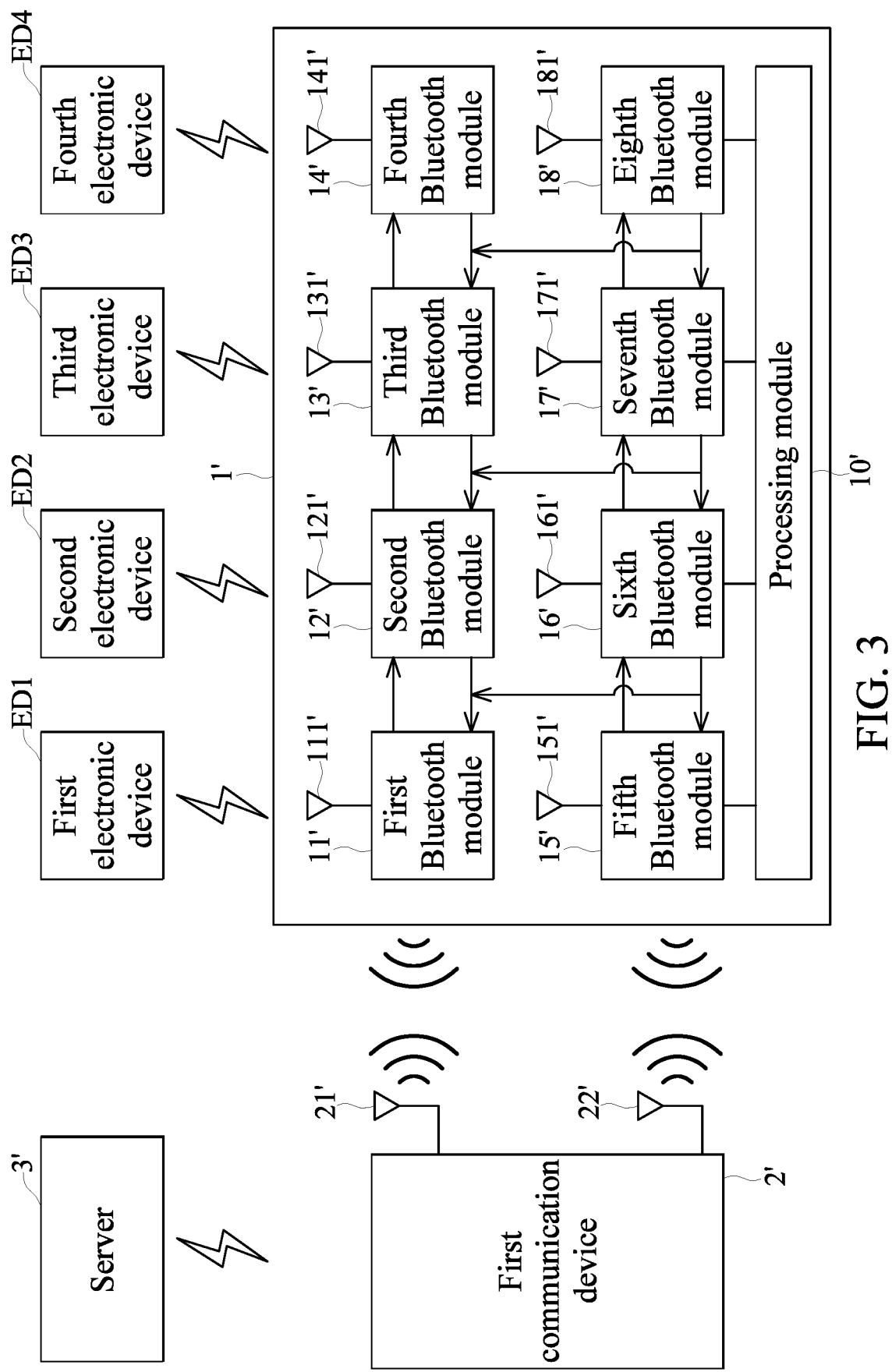
FIG. 3 is another schematic diagram of a Bluetooth gateway communicating with a first communication device according to an embodiment of the present disclosure.

Referring to FIG. 3, FIG. 3 is another schematic diagram of a Bluetooth gateway communicating with a first communication device according to an embodiment of the present disclosure.

The Bluetooth gateway 1' of FIG. 3 is similar to the Bluetooth gateway 1' of FIG. 2. The difference between the Bluetooth gateway 1' of FIG. 3 and the Bluetooth gateway 1' of FIG. 2 is that the first UART channel (not shown), the second UART channel (not shown), the third UART channel (not shown), the fourth UART channel (not shown), the fifth UART channel (not shown), the sixth UART channel (not shown), the seventh UART channel (not shown), and the eighth UART channel (not shown) of the first Bluetooth module 11', the second Bluetooth module 12', the third Bluetooth module 13', the fourth Bluetooth module 14', the fifth Bluetooth module 15, the sixth Bluetooth module 16', the seventh Bluetooth module 17', and the eighth Bluetooth module 18' communicate with the first communication device 2' by the first communication antenna 21' and the second communication antenna 22'.

In the embodiment, the first UART channel (not shown) of the first Bluetooth module 11', the second UART channel (not shown), the third UART channel (not shown), and the fourth UART channel (not shown) of the first Bluetooth module 11', the second Bluetooth module 12', the third Bluetooth module 13', and the fourth Bluetooth module 14' communicate with the first communication device 2' by a first wireless communication protocol.

The fifth UART channel (not shown) and the sixth UART channel (not shown), the seventh UART channel (not shown), and the eighth UART channel of the fifth Bluetooth module 15', the sixth Bluetooth module 16', the seventh Bluetooth module 17', and the eighth Bluetooth module 18' communicate with the second communication device 2' by the second communication protocol.

In the embodiment, the first wireless communication protocol and the second wireless communication protocol include a WiFi communication protocol, a Sigfox communication protocol, a LoRa communication protocol, a fourth generation mobile communication technology communication protocol (4G), or a fifth generation mobile communications technology communications protocol (5G).

In conclusion, the Bluetooth gateway of the present disclosure uses a plurality of Bluetooth modules and a preset communication sequence, so that the Bluetooth signals of the devices of the plurality of electronic devices can be processed immediately, thereby significantly improving the user experience. The Bluetooth gateway of the present disclosure can transmit a transmission period adjusting request signal to each electronic device to adjust the transmission period for improving the processing efficiency.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A Bluetooth gateway communicating with a plurality of electronic devices, the Bluetooth gateway comprising:
   a first Bluetooth module including a first communication sequence; and
   a second Bluetooth module being electrically connected to the first Bluetooth module and including a second communication sequence;
   wherein the first Bluetooth module and the second Bluetooth module determine whether to communicate with one of the electronic devices based on the first communication sequence and the second communication sequence, and current connection states of the first Bluetooth module and the second Bluetooth module;
   wherein the second Bluetooth module communicates with one of the electronic devices only when the current connection state of the first Bluetooth module is a connected state with another electronic device of the electronic devices, and the second Bluetooth module is in an unconnected state, when the current connection states of the first Bluetooth module and the second Bluetooth module are in the unconnected state, the first Bluetooth module communicates one of the electronic devices before the second Bluetooth module communicates another electronic device of the electronic devices;
   wherein when two of the plurality of electronic devices simultaneously transmit the device Bluetooth communication signal, and the first Bluetooth module and the second Bluetooth module simultaneously and respectively receive the device Bluetooth communication signals of the two of the electronic devices, the Bluetooth gateway transmits a transmission period adjusting request signal to the two of the electronic devices, such that the two of the electronic devices adjust the transmission period of the device Bluetooth communication signals to transmit the device Bluetooth communication signals to the first Bluetooth module and the second Bluetooth module of the Bluetooth gateway.

2. The Bluetooth gateway of claim 1, wherein when the current connection state of the first Bluetooth module is an unconnected state, the first Bluetooth module communicates with one of the electronic devices.

3. The Bluetooth gateway of claim 1, wherein the electronic devices respectively transmit a device Bluetooth communication signal.

4. The Bluetooth gateway of claim 1, wherein the first Bluetooth module includes:
   a first Bluetooth communication unit receiving a plurality of communication signals;
   a first storage unit being electrically connected to the Bluetooth communication unit; and
   a first universal asynchronous receiver-transmitter channel being electrically connected to the Bluetooth communication unit and the storage unit;
   wherein the communication signals received by the first Bluetooth communication unit are transmitted through the first universal asynchronous receiver-transmitter channel.

5. The Bluetooth gateway of claim 4, wherein when two of the plurality of electronic devices simultaneously transmit the device Bluetooth communication signal, and the first Bluetooth module and the second Bluetooth module simultaneously and respectively receive the device Bluetooth communication signals of the two of the electronic devices, the Bluetooth gateway transmits a transmission period adjusting request signal to the two of the electronic devices, such that the two of the electronic devices adjust the transmission period of the device Bluetooth communication signals.

6. The Bluetooth gateway of claim 5, wherein the signals transmitted by the first universal asynchronous receiver-transmitter channel and the universal asynchronous receiver-transmitter channel are transmitted to a server by a first wireless communication protocol.

7. The Bluetooth gateway of claim 6, wherein the first wireless communication protocol includes a WiFi communication protocol, a Sigfox communication protocol, a LoRa communication protocol, and a fourth generation mobile communication technology communication protocol, and a fifth-generation mobile communication technology communication protocol.

8. A Bluetooth gateway communicating with a plurality of electronic devices, the Bluetooth gateway comprising:
   a first Bluetooth module including a first communication sequence;
   a second Bluetooth module being electrically connected to the first Bluetooth module and including a second communication sequence; and
   a third Bluetooth module being electrically connected to the first Bluetooth module and the second Bluetooth module, and including a third communication sequence;
   wherein the first Bluetooth module and the second Bluetooth module determine whether to communicate with one of the electronic devices based on the first communication sequence and the second communication sequence, and current connection states of the first Bluetooth module and the second Bluetooth module;
   wherein the second Bluetooth module communicates with one of the electronic devices only when the current connection state of the first Bluetooth module is in a connected state with another electronic device of the electronic devices, and the second Bluetooth module is in an unconnected state;
   wherein the third Bluetooth module communicates with one of the electronic devices only when the current connection state of the first Bluetooth module is a connected state with another electronic device of the electronic devices, the current connection state of the second Bluetooth module is a connected state with other electronic device of the electronic devices, and the third Bluetooth module is in the unconnected state; and
   wherein the first Bluetooth module and the third Bluetooth module are in the unconnected state, and current connection state of the second Bluetooth module is a connected sate with one of the electronic devices, the first Bluetooth module communicates another electronic device of the electronic devices before the third Bluetooth module communicates other electronic device of the electronic devices;
   wherein when two of the plurality of electronic devices simultaneously transmit the device Bluetooth communication signal, and the first Bluetooth module and the second Bluetooth module simultaneously and respectively receive the device Bluetooth communication signals of the two of the electronic devices, the Bluetooth gateway transmits a transmission period adjusting request signal to the two of the electronic devices, such that the two of the electronic devices adjust the transmission period of the device Bluetooth communication signals to transmit the device Bluetooth communication signals to the first Bluetooth module and the second Bluetooth module of the Bluetooth gateway.

\* \* \* \* \*